US008183824B2

(12) United States Patent
Emek et al.

(10) Patent No.: US 8,183,824 B2
(45) Date of Patent: May 22, 2012

(54) ADAPTIVE MODE CHANGE FOR POWER UNIT

(75) Inventors: Necdet Emek, Santa Clara, CA (US); Mario Chunhwa Huang, Milpitas, CA (US)

(73) Assignee: Integrated Memory Logic, Inc., Campbell, CA (US)

(*) Notice: Subject to any disclaimer, the term of this patent is extended or adjusted under 35 U.S.C. 154(b) by 773 days.

(21) Appl. No.: 11/151,163

(22) Filed: Jun. 10, 2005

(65) Prior Publication Data

US 2006/0279562 A1 Dec. 14, 2006

(51) Int. Cl.
*H02J 7/00* (2006.01)

(52) U.S. Cl. ........................................ 320/107; 323/234

(58) Field of Classification Search .................... 345/82; 320/107, 110; 323/234
See application file for complete search history.

(56) References Cited

U.S. PATENT DOCUMENTS

| | | | | |
|---|---|---|---|---|
| 5,471,194 | A * | 11/1995 | Guscott | 340/511 |
| 5,754,571 | A * | 5/1998 | Endoh et al. | 372/20 |
| 6,095,661 | A | 8/2000 | Lebens et al. | |
| 6,225,912 | B1 * | 5/2001 | Tanaka et al. | 340/641 |
| 6,621,235 | B2 | 9/2003 | Chang | |
| 6,690,340 | B2 * | 2/2004 | Sakura et al. | 345/46 |
| 6,731,202 | B1 * | 5/2004 | Klaus | 340/425.5 |
| 6,836,157 | B2 | 12/2004 | Rader et al. | |
| 6,853,566 | B2 | 2/2005 | Itoh | |
| 6,989,807 | B2 * | 1/2006 | Chiang | 345/82 |
| 7,459,959 | B2 | 12/2008 | Rader et al. | |
| 7,492,108 | B2 | 2/2009 | Garcia et al. | |
| 7,714,515 | B2 | 5/2010 | Emek et al. | |
| 2002/0056445 | A1 * | 5/2002 | Inagaki et al. | 123/609 |
| 2002/0070688 | A1 * | 6/2002 | Dowling et al. | 315/312 |
| 2003/0011349 | A1 * | 1/2003 | Kuroiwa et al. | 323/281 |
| 2003/0095406 | A1 * | 5/2003 | Lebens et al. | 362/231 |
| 2003/0214259 | A9 * | 11/2003 | Dowling et al. | 315/312 |
| 2004/0233144 | A1 * | 11/2004 | Rader et al. | 345/82 |
| 2005/0047032 | A1 * | 3/2005 | Kanayama et al. | 361/18 |
| 2005/0219878 | A1 * | 10/2005 | Ito et al. | 363/59 |
| 2006/0279562 | A1 | 12/2006 | Emek et al. | |
| 2007/0205823 | A1 | 9/2007 | Cho | |

* cited by examiner

*Primary Examiner* — Arun Williams
(74) *Attorney, Agent, or Firm* — Sidley Austin LLP

(57) ABSTRACT

In one embodiment of the present invention, a system includes a power stage component operable to generate an output voltage from a power source and to provide the output voltage to an electrical device. The power stage component is capable of operating in a plurality of modes depending on a level of the power source. An adaptive mode change component, coupled to the power stage, is operable to track at least one variation which affects the voltage across the electrical device and to generate at least one control signal for changing among the plurality of operating modes of the power stage component in response to the tracking.

34 Claims, 10 Drawing Sheets

300

| | CTL | | | LED | | | |
|---|---|---|---|---|---|---|---|
| EN | 2 | 1 | 0 | 4 | 3 | 2 | 1 |
| 1 | 0 | 0 | 0 | 0 | 0 | 0 | 1 |
| 1 | 0 | 0 | 1 | 0 | 0 | 1 | 0 |
| 1 | 0 | 1 | 0 | 0 | 1 | 0 | 0 |
| 1 | 0 | 1 | 1 | 1 | 0 | 0 | 0 |
| 1 | 1 | 0 | 0 | 0 | 0 | 1 | 1 |
| 1 | 1 | 0 | 1 | 0 | 1 | 1 | 1 |
| 1 | 1 | 1 | 0 | 1 | 1 | 1 | 1 |
| 1 | 1 | 1 | 1 | 0 | 0 | 0 | 0 |

ADAPTIVE MODE CHANGE FOR POWER UNIT

TECHNICAL FIELD OF THE INVENTION

This invention relates to power management, and more particularly, to adaptive mode change for a power unit.

BACKGROUND

Light emitting diodes (LEDs) can be incorporated into pagers, cellular telephones, personal digital assistants, laptop or notebook computers and other electronic equipment (mostly portable) for display and other visual purposes. If multiple LEDs are used in the visual display of an electronic device, it is important that the brightness of all LEDs is consistent. Otherwise, the visual display will not be as aesthetically pleasing to a user. Furthermore, because most portable electronic devices operate on battery power, it is desirable to optimize or maximize efficiency when driving any LEDs contained therein in order to extend battery life between recharging or replacement. In many cases, as a battery is depleted, any LEDs powered by such battery will begin to fade or become less bright. This can be annoying or distracting for users. Thus, it is desirable to maintain the brightness of LEDs in portable devices even as the battery for the device is depleted.

SUMMARY

According to an embodiment of the present invention, a system is provided for driving at least one light-emitting diode (LED). The system includes means for tracking at least one variation which affects voltage of the at least one LED; means for detecting a level of a power source; and means for generating one or more control signals in response to the tracking means and the detecting means, the control signals for adaptively changing among a plurality of operational modes for driving the at least one LED.

According to another embodiment of the present invention, a system includes a power stage component operable to generate an output voltage from a power source and to provide the output voltage to an electrical device. The power stage component is capable of operating in a plurality of modes depending on a level of the power source. An adaptive mode change component, coupled to the power stage, is operable to track at least one variation which affects the voltage across the electrical device and to generate at least one control signal for changing among the plurality of operating modes of the power stage component in response to the tracking.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

The embodiments of the present invention and their advantages are best understood by referring to FIGS. 1 through 10C of the drawings. Like numerals are used for like and corresponding parts of the various drawings.

Figure 1:
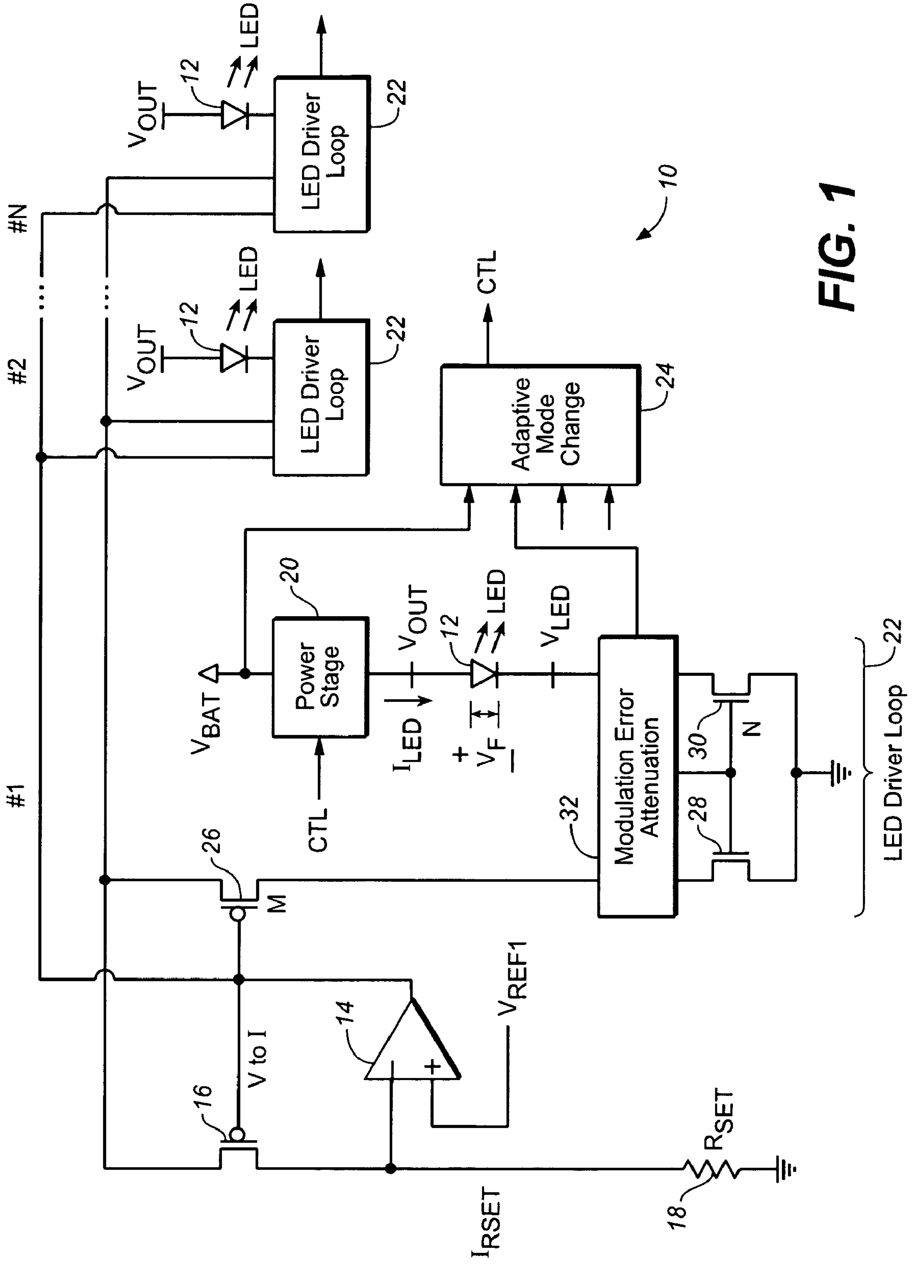
FIG. 1 is a schematic diagram in partial block form of a system for driving one or more light emitting diodes (LEDs), according to an embodiment of the present invention.

FIG. 1 is a schematic diagram in partial block form of a system 10 for driving one or more light emitting diodes (LEDs) 12, according to an embodiment of the present invention. System 10 may be incorporated or used in any electronic device or component—especially portable devices, such as pagers, cellular telephones, personal digital assistants, handheld personal computers (PCs), laptop or notebook computers, wireless appliances, electronic books, LED backlights, LED keypad backlights, and the like—having LEDs. System 10 may be connected to or incorporate a power source or battery which provides a battery voltage Vbat (e.g., in the range of 2.5 to 5.5 V) that is used for driving the LEDs 12. The battery can be a single or multiple cells of Li-Ion, NiMH, or other suitable type of battery.

System 10 may be designed for or used with any suitable number of LEDs 12 (e.g., 1, 2, 4, etc.). LEDs 12 are connected in system 10 between a first terminal (at which an output voltage Vout appears) and a respective second terminal (having a voltage Vled). Each LED 12 may be a discrete device which is separately manufactured and operable to be connected to system 10. Each LED 12 has a forward voltage Vf, which is the voltage drop across the diode (from Vout to Vled in FIG. 1) when current Iled flows through the LED 12. Due to process variations in the manufacture of LEDs 12 or other factors, the LEDs 12 may have differing operating characteristics. For example, the forward voltage Vf for a given value of LED current Iled may vary from one LED 12 to another. Thus, one LED 12 may appear to be brightly lit when a voltage of 4V is applied thereto, whereas another LED 12 may appear to be dimly lit when the same amount of voltage is applied. As described herein, in various embodiments, system 10 provides and maintains uniform or consistent brightness of the LEDs 12 in an efficient manner. In one embodiment, LEDs 12 can be separately turned on and off by system 10 as appropriate for the application or device in which the LEDs are used.

As shown, system 10 includes a operational amplifier 14, a transistor 16, a resistor Rset 18, a power stage component 20, one or more LED driver loops 22, and an adaptive mode change component 24. In various embodiments, system 10 can be implemented on a single integrated circuit (IC) chip, multiple IC chips, or in discrete components which are connected to one or more LEDs 12. For example, in one embodiment, the resistor Rset 18 can be implemented as a discrete component with the remaining portions of system 10 implemented in an IC chip with suitable input/output (I/O) terminals for connecting to LEDs 12 and receiving or sending signals (e.g., for control, etc.).

Power stage component 20 of system 10 generally functions to provide output voltage Vout for powering LEDs 12 using the battery voltage Vbat. Because battery voltage Vbat is variable over a battery's lifetime, output voltage Vout is also variable since it is derived from the battery voltage Vbat. Power stage component 20 may operate in a number of different modes in order to maintain the output voltage Vout at a level sufficient so that each LED 12 is consistently bright even as the battery power (Vbat) is depleted. In one embodiment, power stage component 20 can have three operating modes: a 1× operating mode, a 1.5× operating mode, and a 2× operating mode. In 1× operating mode, power stage component 20 generates an output voltage Vout with essentially the same voltage value as battery voltage Vbat. In 1.5× operating mode, power stage component 20 generates an output voltage Vout having a voltage value that is essentially one-and-a-half times greater than the battery voltage Vbat. In 2× operating mode, power stage component 20 generates an output voltage Vout with a voltage value which is essentially twice that of battery voltage Vbat. It should be understood that in other embodiments, power stage component 20 can have a fewer or greater number of operating modes, with other values. In order to obtain the highest overall efficiency, power stage component 20 is not regulated.

Power stage component 20 may receive one or more control CTL signals for causing the power stage component 20 to change from one mode of operation into another. In some embodiments, as described in more detail herein, power stage component 20 may be implemented using a transistor and a charge pump. The output terminal at which an LED 12 is coupled to power stage component 20 to receive the voltage out Vout can be an anode for the LED 12.

Operational amplifier 14, transistor 16, and resistor Rset 18 function to provide a current Irset which is mirrored in each LED driver loop 22 by the respective transistor 26. Operational amplifier 14 receives a bandgap reference voltage Vref1 at its non-inverting (+) input terminal and a voltage value equal to Irset×Rset at its inverting (−) input terminal. The output terminal of operational amplifier 14 is connected to the gates of transistor 16 and each transistor 26 of an LED driver loop 22. In one embodiment, bandgap reference voltage Vref1 can be arbitrarily set to a suitable value (e.g., 1V). Current Irset is the amount of current flowing through transistor 16 and is set by the value of resistor Rset 18. In particular, in one embodiment, Iset=Vref1/Rset. Transistor 16 can be implemented as a p-channel MOSFET and may function as a switch for system 10. In one embodiment, resistor Rset 18 can be set or configured to provide the desired amount of current Irset for operation of system 10. Rset 18 develops the voltage value which is received by operational amplifier 14 at its (−) terminal.

A separate LED driver loop 22 may be associated with and connected to each LED 12 in system 10. The terminal at which the respective LED 12 is connected to driver loop 22 can be an anode for the LED. An LED driver loop 22 generally operates in conjunction with power stage component 20 to drive and sink current for the respective LED 12. If multiple LEDs 12 are supported, then the current provided to the various LEDs 12 can be matched to provide consistent LED brightness. As depicted, each LED driver loop 22 includes transistor 26, 28, and 30 and a modulation error attenuation component 32.

Transistor 26 can be implemented with a p-channel MOSFET in one embodiment. Transistor 26 may be part of a current mirror which also comprises transistor 16. As such, the current Irset flowing through transistor 16 is mirrored by the bias current Ibias flowing through transistor 26. In one embodiment, there may be a gain M between Irset and Ibias such that Ibias=Irset×M, where M can have a value of, for example, 3. Transistors 28 and 30 of each LED driver loop 22 can be implemented with n-channel MOSFETs in one embodiment, and may function to sink current. In one embodiment, transistor 28 and 30 are operated in the saturation region, and are prevented from entering into the linear region. Transistors 28 and 30 form a current mirror such that, in some embodiments, the bias current Ibias flowing through transistor 28 is mirrored by the LED current Iled flowing through transistor 30 and also across LED 12. In one embodiment, there may be a gain N between the bias current Ibias and the LED current Iled such that Ibias=N×Iled, where N can have a value of, for example, 160. As such, the value of the LED current Iled can be Iled=N×M×Vref1/Rset. With N, M, and Vref1 fixed, LED current Iled can be determined or set by choosing a value for resistor Rset 18. From one perspective, the accuracy of system 10 may be considered to be how well the LED current Iled can be maintained at a desired value (e.g., Iled=N×M×Vref1/Rset).

Modulation error attenuation component 32 is connected to the transistor 26 and the LED 12 associated with LED driver loop 22. Modulation error attenuation component 32 generally functions to attenuate or eliminate Vds modulation error. Vds modulation error causes significant variations in LED current Iled which, as set forth above, desirably should be maintained at a particular value (e.g., Iled=N×M×Vref1/Rset). Vds modulation error arises due to the large variation in the drain-source voltage Vds of transistor 30, where Vds=Vout−Vf=Vled. This large variation in the drain-source voltage Vds is attributable to variations in Vout (e.g., due to a drop in battery power) and in diode forward voltage Vf (e.g., due to process variations in the manufacturing of LEDs 12). As a result, depending on the value of battery voltage Vbat and the respective diode forward voltages Vf of individual LEDs 12, the Vled voltage may vary in the range of 0.1V to 3V. As such, the LED current Iled would otherwise vary with battery voltage Vbat and diode forward voltage Vf, rather than be maintained at the desired value (e.g., Iled=N×M×Vref1/Rset).

Modulation error attenuation component 32 reduces or eliminates Vds modulation error by accurately maintaining the same voltage levels at the three terminals (gate, source, and drain) of both transistors. In some embodiments, modulation error attenuation component 32 maintains the drain voltages of transistors 28 and 30 at the same level and maintains the gate voltages of transistors 28 and 30 at the same level. As such, transistors 28 and 30 have the same drain-source voltage Vds and the same gate-source voltage Vgs. Since the terminal voltages of transistors 28 and 30 are the same with a fixed current Ibias as a reference, the value of Iled is exactly equal to N times Ibias regardless of Vled variations (attributable to variations in battery voltage Vbat or output voltage Vout), process variations (e.g., differences in diode forward voltages Vf), and temperature variations. Modulation error attenuation component 32 may have a relatively high current sink output impedance: Rout=A×Rds. Further details and various implementations for modulation error attenuation component 32 are provided herein.

Adaptive mode change component 24 is connected to the battery and to each LED 12. Adaptive mode change component 24 generally functions to output one or more control signals CTL for causing power stage component 20 to change from one mode of operation to another. Adaptive mode change component 24 receives the Vled values for each LED 12 and respective LED driver loop 22.

Variations in forward voltage Vf, process, temperature, LED current Iled, etc. all effect the voltage Vled in system 10. In some embodiments, adaptive mode change component 24 adaptively determines or controls the changes in operating mode of power stage component 20 based on the saturation voltage Vdsat requirements of transistor 30. In particular, adaptive mode change component 24 observes or monitors the voltage Vled, corrects it for temperature and process variations, and initiates changes in operating mode when the voltage Vled has the same value as Vdsat of transistor 30. This provides maximum overall efficiency. Further details and an implementation for adaptive mode change component 24 are provided herein.

Current matching between transistors 28 and 30 in LED driver loop 22 is optimized when these transistors are operated in the saturation region:

$$Vdsat=(Vgs-Vth)<=Vds=Vled$$

where Vdsat is the saturation voltage of transistor. If Vdsat>Vds=Vled, then the transistors 28 and 30 are operating in the linear region and their current matching significantly degrades, and the Iled current may not be well regulated. In one embodiment, system 10 operates transistors 28 and 30 in saturation region and prevents them from going into linear region operation.

In operation, system 10 provides output voltage Vout (derived from the battery voltage Vbat) for driving one or more LEDs 12. When the battery is new or freshly recharged, and for some amount of time thereafter, the value of battery voltage Vbat will be relatively high—i.e., the battery voltage Vbat will be higher than the sum of diode forward voltage Vf and Vled. Power stage component 20 operates in 1× operating mode, where the battery voltage Vbat is provided as output voltage Vout (i.e., output voltage Vout has essentially the same voltage value as battery voltage Vbat). For each LED 12, the respective LED driver loop 22 sinks the desired current set by the Rset resistor 18.

As the battery is depleted of power, the value of battery voltage Vbat begins to decline or drop. Adaptive mode change component 24 detects the decline in battery voltage Vbat and also the values of Vled for the different LEDs 12. At some point, when the value of voltage Vbat has dropped below a particular threshold (Vbat≦Vf+Vdsat of transistor 30—e.g., 3.8V), then adaptive mode change component 24 outputs a control CTL signal which causes power stage component 20 to switch into 1.5× operating mode, where the output voltage Vout provided by power stage component 20 has a voltage value that is essentially one-and-a-half times greater than the battery voltage Vbat. Again, the LED driver loops 22 for the various LEDs 12 function to sink the desired current set by the Rset resistor 18.

As the battery continues to be depleted of power, at some other point the value of voltage Vbat may drop below another threshold (1.5×Vbat≦Vf+Vdsat of transistor 30—e.g., 2.8V). Adaptive mode change component 24 outputs a control CTL signal which causes power stage component 20 to switch into 2× operating mode, where the output voltage Vout provided by power stage component 20 has a voltage value which is essentially twice that of the battery voltage Vbat.

Although the adaptive mode change component 24 is primarily described herein as being used with and adaptive for variations associated with an LED, it should be understood that the adaptive mode technique according to embodiments of the invention is not so limited. Rather, the adaptive mode technique is broadly applicable for use with any element, component, or device, such as a battery charger or overcurrent protection devices, in which variations in process, operation, etc. may affect performance or efficiency, either of the device itself or the system within which it is incorporated.

Figure 2:
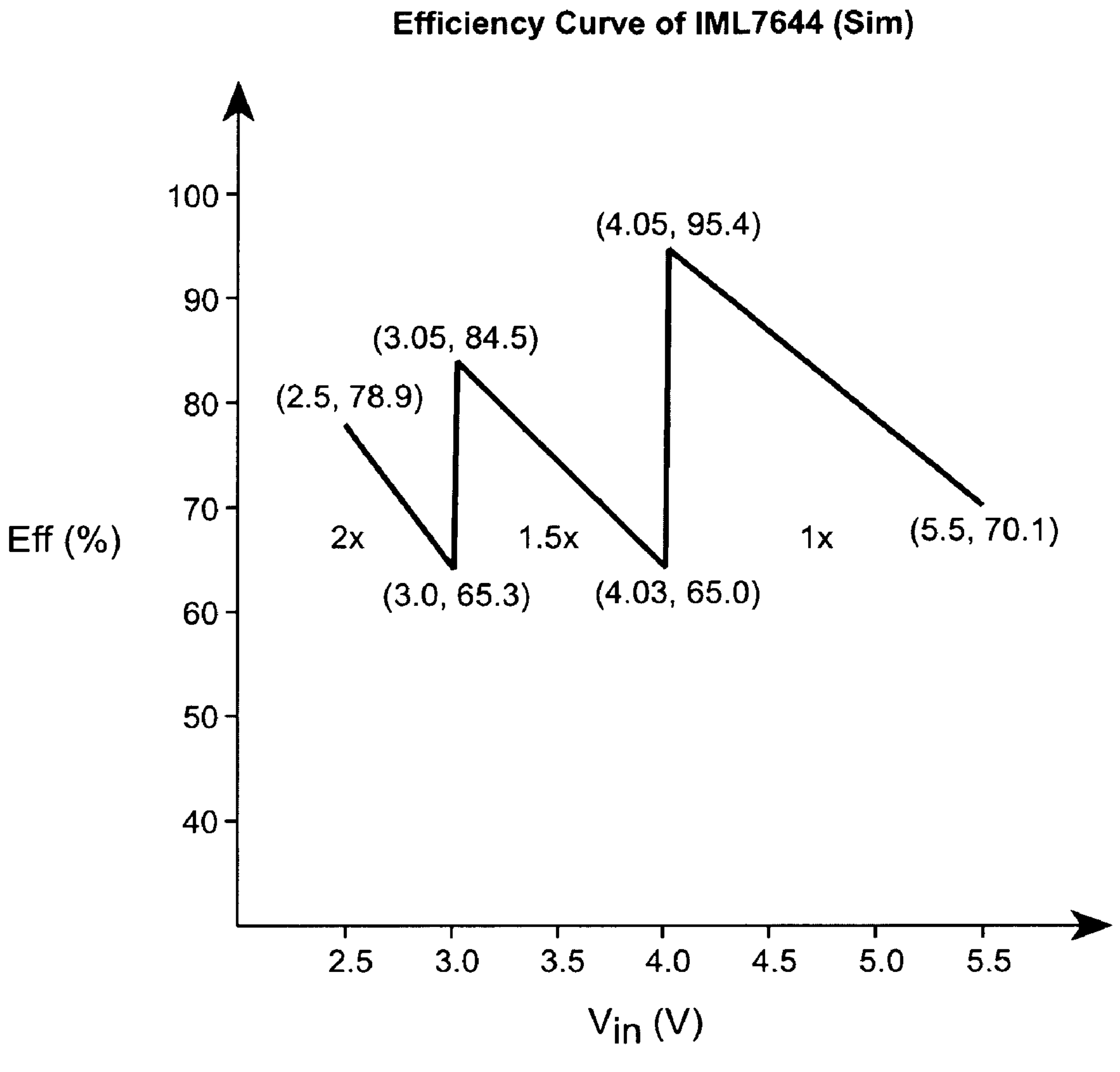
FIG. 2 is a chart illustrating the efficiency of the system of FIG. 1 versus the value of the voltage supply, according to an embodiment of the present invention.

FIG. 2 is a chart 40 illustrating the efficiency of system 10 of FIG. 1 versus the value of the voltage supply, according to an embodiment of the present invention. As shown, the efficiency of system 10 can vary from, for example, 55-95%, depending on the values of the LED current Iled and the supply or battery voltage Vbat.

The right side of the chart 40 (with, for example, 4.5 V value for the supply voltage) corresponds to a freshly charged or new battery. Here the system is operated in the 1× operating mode in which the output voltage Vout supplied to LEDs 12 has the same value as the battery voltage Vbat. The efficiency of system 10 for this state of the battery is not the maximum for the system because the full voltage value of the battery is not required for driving the LEDs 12—only a portion of that value is sufficient. As such, there is some wasted power. As the battery depletes (moving from the right side to the left side of the chart 40), efficiency of the system 10 increases. This is because as the value of the battery voltage decreases with the depletion of the battery, more of the full voltage value of the battery is used for driving the LEDs 12.

At some point, when the value of the battery voltage Vbat is between, for example, 3.5 and 3.1 V, system 10 is switched or changed to operate in the 1.5× operating mode in which the output voltage Vout supplied to LEDs 12 has a value of one-and-a-half times that of the battery voltage Vbat. Here, the charge pump of power stage component 20 is used to generate the higher voltage value from the battery voltage Vbat. The charge pump is inherently less efficient, and thus, the efficiency of system 10 decreases. Furthermore, the voltage generated by the charge pump may be greater than that needed to adequately drive the LEDs 12, thereby further decreasing efficiency. As the battery depletes (moving further to the left side of the chart 40), efficiency of the system 10 increases again. This is because as the value of the battery voltage decreases, more of the full value of the voltage generated by the charge pump is used for driving the LEDs 12.

At some point, when the value of the battery voltage Vbat is, for example, less than 2.7 V, system 10 is switched or changed to operate in the 2× operating mode in which the output voltage Vout supplied to LEDs 12 has a value of twice that of the battery voltage Vbat. Again, efficiency of the system 10 drops at first, but increases as the battery continues to deplete. The far left side of the chart 40 corresponds to a battery that is relatively completely depleted.

Movement from the left side to the right side of the chart 40 corresponds to the charging of a battery. As the battery is charged, system 10 is switched from higher operating mode into lower operating mode (e.g., from 2× operating mode to 1.5× operating mode, or from 1.5× operating mode to 1× operating mode).

In some embodiments, the points at which switching between modes occur are fixed. Thus, for example, transition between 1× operating mode and 1.5× operating mode occurs at 3.8V for Vbat in either direction, and transition between 1.5× operating mode and 2× operating mode occurs at 2.8V for Vbat in either direction. In other embodiments, the points at which switching between modes occur are not fixed. Rather, some hysteresis may be introduced when switching from a higher operating mode into a lower operating mode. Thus, for example, transition from 1× operating mode into 1.5× operating mode occurs at 3.7V for Vbat, whereas transition from 1.5× operating mode into 1× operating mode occurs at 3.9V for Vbat. Likewise, for example, transition from 1.5× operating mode into 2× operating mode occurs at 2.7V for Vbat, whereas transition from 2× operating mode into 1.5× operating mode occurs at 2.9V for Vbat. Switching between modes may depend on the signals detected by the LED driver loop 22 and the implementation of the decision making by adaptive mode change component 24.

Figure 3B:
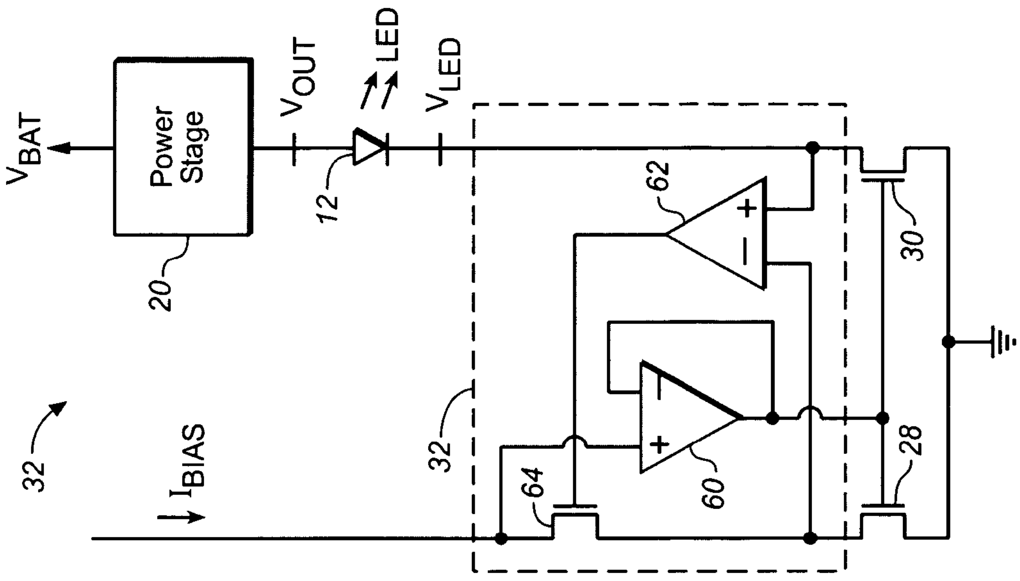
FIG. 3B is a schematic diagram of another implementation for a modulation error attenuation component, according to an embodiment of the present invention.
Figure 3A:
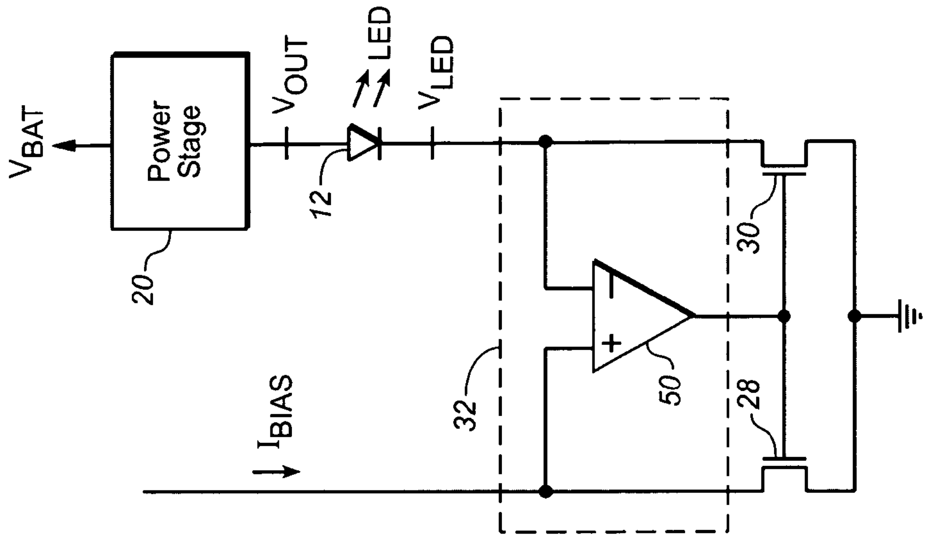
FIG. 3A is a schematic diagram of an implementation for a modulation error attenuation component, according to an embodiment of the present invention.

FIG. 3A is a schematic diagram of an implementation for a modulation error attenuation component 32, according to an embodiment of the present invention. Modulation error attenuation component 32, which can be part of an LED driver loop 22 for a respective LED 12, functions to attenuate or eliminate Vds modulation error for that LED 12.

As shown in FIG. 3A, one implementation for modulation error attenuation component 22 comprises an operational amplifier 50. A non-inverting (+) terminal of operational amplifier 50 is connected to the drain of transistor 28, and an inverting (−) terminal of operational amplifier 50 is connected to the drain of transistor 30 (i.e., the offset of the operational amplifier 50 is imposed on the drain of transistor 30). The output of operational amplifier 50 is applied to the gates of transistors 28 and 30. This forms a negative feedback loop comprising transistor 28 and the non-inverting (+) terminal of operational amplifier 50, and a positive feedback loop comprising transistor 30 and the inverting (−) terminal of operational amplifier 50.

With this arrangement, operational amplifier 50 forces transistor 30 to follow transistor 28. In particular, the drain-source voltage Vds of transistor 30 follows the drain-source voltage Vds of transistor 28. Thus, the current in the right side of the LED driver loop 22 (i.e., LED current Iled) tracks the current in the left side of the LED driver loop 22 (i.e., Ibias), and accordingly, the LED current Iled is substantially maintained at the desired value (e.g., Iled=N×M×Vref1/Rset). In this way, current flowing through the LED 12 is accurately sunk. This substantially reduces or eliminates Vds modulation error. As such, system 10 is highly accurate. Furthermore, with operational amplifier 50 driving the gate of transistor 30, the drain of transistor 30 (at which Vled appears) has relatively high output impedance.

The drain of transistor 30 (i.e., the node for Vled) is driven by the cathode of LED 12 which is connected to low impedance Vout, and thus has relatively low impedance compared to the drain of transistor 28 which is driven by high impedance current source 26. Accordingly, the gain in the negative feedback loop is higher than the gain in the positive feedback loop. This provides additional stability in LED driver loop 22.

Furthermore, although there is an offset error of operational amplifier 50 which causes some mismatch in drain-source voltage Vds of transistor 30 with drain-source voltage Vds of transistor 28, the resultant error in the LED current Iled is relatively small because the offset error is imposed on the drain-source voltage Vds. This is an advantage over previously developed designs in which the operational amplifier's offset error is imposed on the gate voltage Vg, resulting in a relatively large LED current Iled error.

Also, the transistors 28 and 30 used for current sink are implemented in NMOS. NMOS devices are typically stronger than PMOS devices due to better carrier mobility. As such, the transistors 28 and 30 can be designed or made relatively small, thus minimizing the die area needed for implementation.

FIG. 3B is a schematic diagram of another implementation for a modulation error attenuation component 22, according to an embodiment of the present invention. In this implementation, modulation error attenuation component 22 comprises an operational amplifiers 60, 62 and transistor 64. Transistor 64 is connected in series with transistor 28 of the LED driver loop 22. An inverting (−) terminal of operational amplifier 62 is connected to the drain of transistor 28, and a non-inverting (+) terminal of operational amplifier 62 is connected to the drain of transistor 30. The output of operational amplifier 62 is applied to the gate of transistor 64. A non-inverting (+) terminal of operational amplifier 60 is connected to the drain of transistor 64, and an inverting (−) terminal of operational amplifier 60 is connected to the output of the operational amplifier 60. The output of operational amplifier 60 is applied to the gates of transistors 28 and 30.

With this arrangement, the drain-source voltage Vds of transistor 30 follows the drain-source voltage Vds of transistor 28. Operational amplifier 60 adjusts the gate voltages of transistors 28 and 30 so that the value of the LED current Iled stays constant (e.g., Iled=N×M×Vref1/Rset) regardless of variations in Vled. Operational amplifier 62 drives the gate of transistor 64. This biases the transistor 64 to operate in the desired gate to source voltage.

Figure 3C:
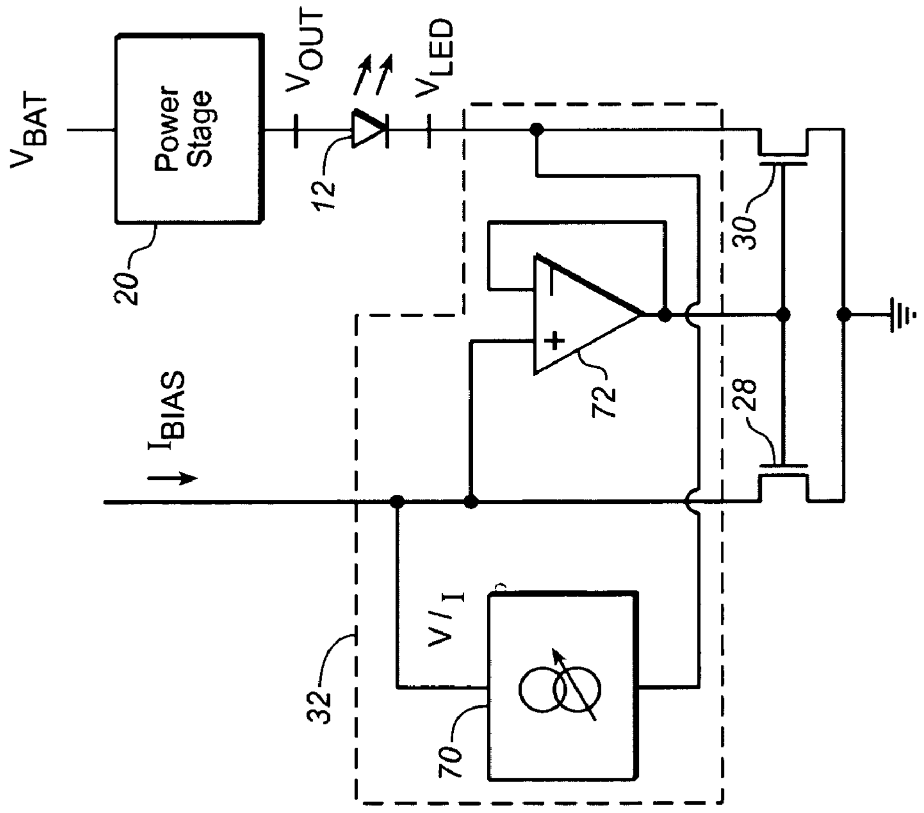
FIG. 3C is a schematic diagram of yet another implementation for a modulation error attenuation component, according to an embodiment of the present invention.

FIG. 3C is a schematic diagram of yet another implementation for a modulation error attenuation component 22, according to an embodiment of the present invention. In this implementation, as shown, modulation error attenuation component 22 comprises a voltage-to-current (V/I) converter component 70 and an operational amplifier 72. V/I converter component 70 is connected to the drain of transistor 30 of the LED driver loop 22 to receive the Vled signal (which is the drain-source voltage Vds of transistor 30). V/I converter component 70 converts the drain-source voltage Vds of transistor 30 to a correction current Icorrect. The correction current Icorrect is an estimate of LED current Iled error. The correction current Icorrect may be subtracted from the bias current Ibias. A non-inverting (+) terminal of operational amplifier 72 is connected to the drain of transistor 28, and an inverting (−) terminal of operational amplifier 72 is connected to the output of the operational amplifier 72. The output of operational amplifier 72 is applied to the gates of transistors 28 and 30.

Since the implementations for modulation error attenuation component 32 shown in FIGS. 3A through 3C may eliminate or substantially reduce Vds modulation error on the LED current Iled, LED driver loop 22 has smaller or no variations in LED current Iled even when there are variations in battery power (e.g., Vbat), manufacturing process, and temperature. This can be understood when considering the following equation for the LED current Iled, which is also the current I through the transistor 30:

$$I=\beta/2(Vgs-Vt)^2(1+\lambda Vds)$$

where Vt is the threshold voltage for the transistor and λ is very small. In some previously developed designs, the gate of the transistor is driven by an operational amplifier outputting a signal corresponding to Vgs in the above equation. Thus, small changes in the driving signal could translate into relatively large changes in the current I. However, with embodiments of the present invention, the gate of the transistor 30 is driven by an operational amplifier outputting a signal corresponding to Vds in the above equation. Thus, changes in the driving signal do not cause significant changes in the current I.

The LED driver loop 22 with the modulation error attenuation component 32 provides numerous advantages over prior art implementations. For example, as described above, the LED driver loop 22 places the offset of an operational amplifier as Vds error, resulting in improved matching for LED to LED and Rset current to LED current. Unlike previously developed designs, the operational amplifier of LED driver loop 22 does not need to be trimmed. LED driver loop 22 also eliminates the need for a source degeneration resistor (SDR) as required by previously developed designs. This eliminates the need to trim or actively control the SDR, thus making it a more elegant approach. Furthermore, the system is more efficient than the previously developed designs since there is no power loss across an SDR.

In the LED driver loop 22 with the modulation error attenuation component 32, transistors 28 and 30 can be implemented using n-channel transistors to sink current. By using n-channel transistors for current sink, integrated circuit (IC) die area is minimized. That is, an implementation with p-channel transistors for current sink would have a higher drain-source voltage Vds for the same area since p-channel carrier mobility is lower. In addition, because n-channel transistors may be used for current sink, a transistor for 1× operating mode in power stage component 20 (see FIG. 4) can be implemented with a p-channel switch. This still provides a savings in die area compared to an implementation using p-channel transistors to sink current and an n-channel transistor for 1× operating mode.

Figure 4:
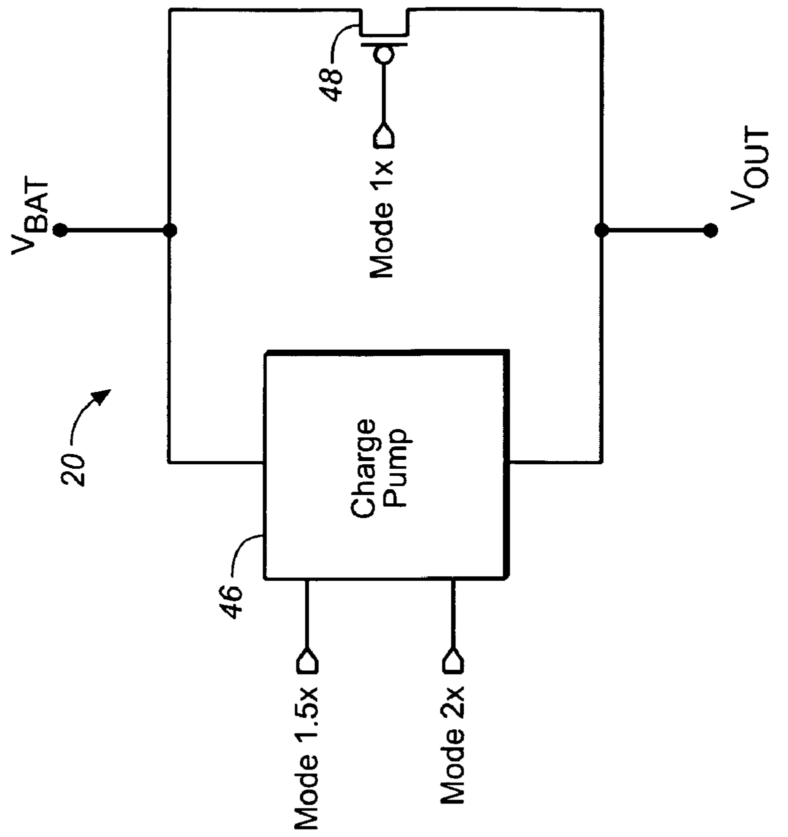
FIG. 4 is a schematic diagram for a power stage component, according to an embodiment of the present invention.

FIG. 4 is a schematic diagram for a power stage component 20, according to an embodiment of the present invention. Power stage component 20 functions to provide output voltage Vout for powering LEDs 12 using the battery voltage Vbat. As depicted, power stage component 20 may comprise a charge pump 46 and a transistor 48.

Transistor 48 functions to provide the power from power stage component 20 in 1× operating mode. As shown, transistor 48 can be implemented using a p-channel transistor. Transistor 48 receives a control signal mode 1×. When control signal mode 1× has a particular value (e.g., low), transistor 48 provides the battery voltage Vbat to the Vout node at which LEDs 12 are connected.

Charge pump 46 functions to provide the power from power stage component 20 in 1.5× and 2× operating modes. Charge pump 46 can be implemented in any suitable configuration, as understood by one of ordinary skill in the art. Charge pump 46 generates a higher voltage level using the battery voltage Vbat. Charge pump 46 receives control signals mode 1.5× and mode 2×. When control signal mode 1.5× has a particular value, charge pump 46 generates a voltage that is 1.5 times the value of battery voltage Vbat and outputs this at Vout. When control signal mode 2× has a particular value, charge pump 46 generates a voltage that is 2 times the value of battery voltage Vbat and outputs this at Vout.

Figure 5:
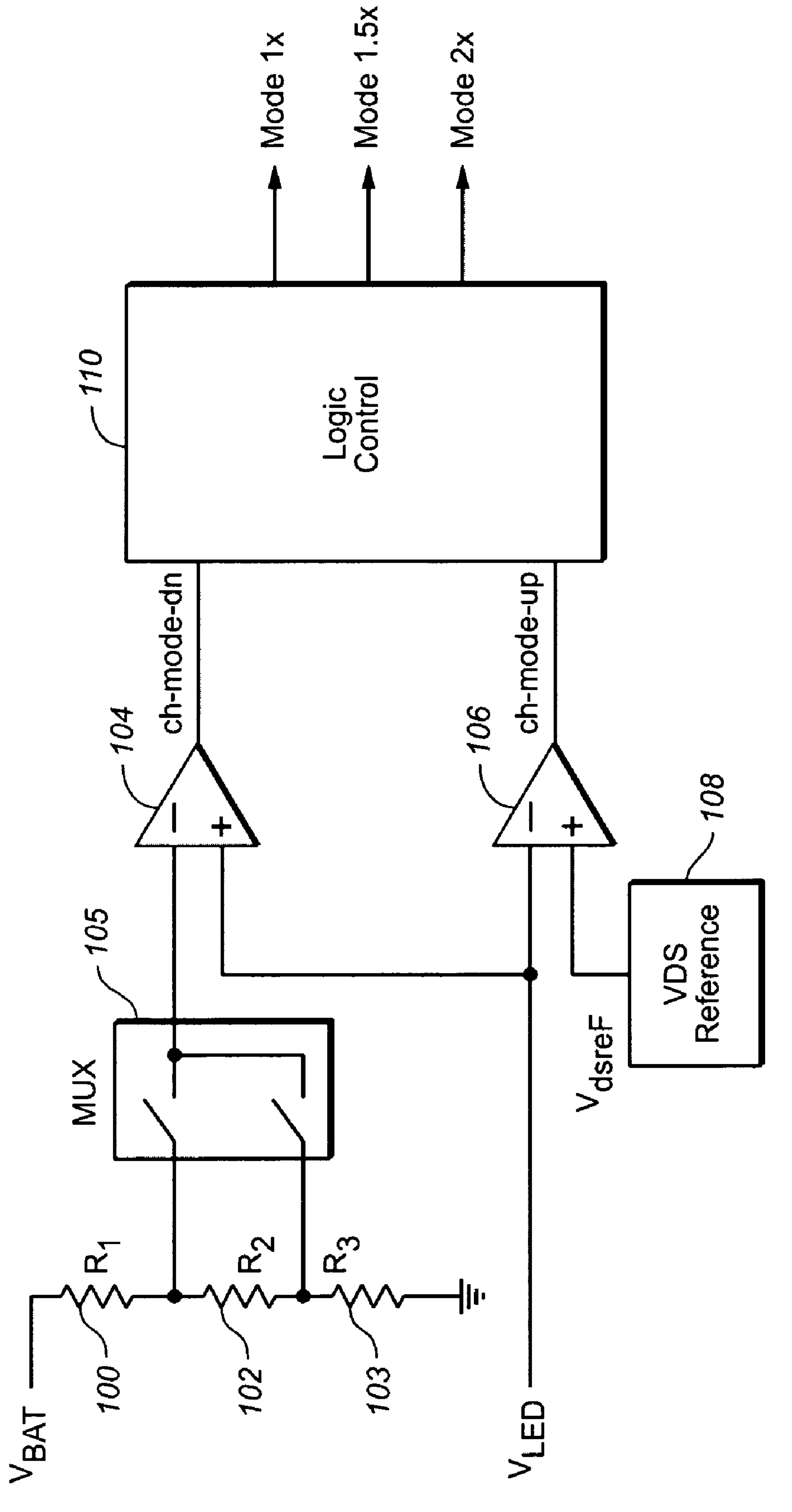
FIG. 5 is a schematic diagram for an adaptive mode change component, according to an embodiment of the present invention.

FIG. 5 is a schematic diagram for an adaptive mode change component 24, according to an embodiment of the present invention. Adaptive mode change component 24 functions to output one or more control signals CTL for causing power stage component 20 to change from one mode of operation to another in response to the levels of the battery voltage Vbat and voltage Vled. Unlike previously developed designs which are responsive only to the battery voltage, adaptive mode change component 24 also takes into account other factors, such as, variations in LED diode forward voltage (Vf), LED current Iled, and other process and temperature variations. This provides greater efficiency than previous designs.

As depicted in FIG. 5, adaptive mode change component 24 may comprise resistors 100, 102, 103, comparators 104, 106, multiplexer 105, Vds reference generator 108, and logic control component 110.

Resistors 100, 102, and 103 are connected in series and function to divide the battery voltage Vbat into two signals. In one embodiment, each of resistors 100, 102, and 103 may have a value of 500K Ω. Multiplexer 105 functions to multiplex the signals from the nodes between resistors 100, 102, and 103. Comparator 104 receives the output of multiplexer 105 at its inverting (−) terminal and the voltage Vled at its non-inverting (+) terminal. Comparator 104 outputs a ch-mode-dn signal which can be used to cause the power stage component 20 to change from a higher operating mode to a lower one (e.g., from 2× operating mode to 1.5× operating mode, or from 1.5× operating mode to 1× operating mode). Comparator 106 receives the voltage Vled at its inverting (−) terminal and a reference voltage Vdsref at its non-inverting (+) terminal. Comparator 106 outputs a ch-mode-up signal which can be used to cause the power stage component 20 to change from a lower operating mode to a higher one (e.g., from 1× operating mode to 1.5× operating mode, or from 1.5× operating mode to 2× operating mode).

The reference voltage Vdsref is generated by Vds reference generator 108. The reference voltage Vdsref is adaptive and may change to have a value slightly higher than the saturation voltage Vdsat of transistor 30 in the LED driver loop 22 at all times, regardless of variations in forward voltage Vf, process, temperature, LED current Iled, and the like. By closely tracking the saturation voltage Vdsat of transistor 30, reference voltage Vdsref allows transistor 30 to be operated at minimum saturation voltage Vdsat at the time of each change from a lower operating mode to a higher one (e.g., from 1× operating mode to 1.5× operating mode, or from 1.5× operating mode to 2× operating mode). This provides for maximum efficiency by adaptively minimizing the voltage Vled over variations in process, temperature, current, and the like while maintaining the brightness of LEDs 12.

Logic control component 110 receives the ch-mode-up and the ch-mode-dn signals from comparators 104 and 106, respectively. Logic control component 110 functions to generate one or more control signals. As shown, these control signals are mode 1×, mode 1.5×, and mode 2×. The control signals mode 1×, mode 1.5×, and mode 2× are provided to power stage component 20 to cause the power stage component 20 to operate in one of the mode of the 1×, 1.5×, or 2× operating modes. Logic control component 110 can be implemented with any suitable circuitry, such as, for example, a state machine.

With a new or freshly charged battery, adaptive mode change component 24 causes power stage component 20 to operate in 1× operating mode, which is the most efficient for system 10.

Power stage component 20 continues to be operated in 1× operating mode until the battery voltage Vbat decreases to a point where the value of the LED voltage Vled is approximately equal to the Vdsat of transistor 30. If the LED voltage Vled drops any lower than Vdsat of transistor 30, transistor 30 will not operate in saturation, and the accuracy of the LED current Iled degrades sharply. Thus, in order to maintain the accuracy of the LED current Iled, adaptive mode change component 24 generates signals to cause the power stage component 20 to switch to 1.5× operating mode when value of the LED voltage Vled is approximately equal to the Vdsat of transistor 30. This causes the value of the output voltage Vout to increase, which in turn causes an increase in the value of the LED voltage Vled so that accuracy of the LED current Iled is maintained.

The adaptive mode change component 24 continues to operate power stage component 20 in 1.5× operating mode until the battery voltage Vbat again decreases to the point where the value of the LED voltage Vled is approximately equal to the Vdsat of transistor 30. When this happens, adaptive mode change component 24 generates signals to cause the power stage component 20 to switch to 2× operating mode. This again causes the value of the output voltage Vout to increase, which in turn causes an increase in the value of the LED voltage Vled so that accuracy of the LED current Iled is maintained.

In the situation where the value of the battery voltage Vbat is increasing, the adaptive mode change component 24 may adjust the power stage component 20 to switch from a higher operating mode to a lower one. In one embodiment, such switching from higher to lower operating mode does not occur at the same points as the switching from lower to higher operating mode. Instead, adaptive mode change component 24 observes or determines a predetermined fraction of the value of the battery voltage Vbat and compares it with the drain-source voltage Vds of transistor 30 (i.e., the LED voltage Vled). By design, if the value of LED voltage Vled is higher than the predetermined fraction of the battery voltage Vbat, then the battery voltage Vbat is sufficient to support a lower operating mode (i.e., there is a sufficient margin between the output voltage Vout and the drain-source voltage Vds for a lower operating mode). In this case, adaptive mode change component 24 generates signals to switch power stage component 20 from the higher operating mode to the lower one. This scheme provides or introduces an amount of hysteresis into system 10 which prevents oscillations between operating modes of power stage component 20 which might otherwise occur due to premature switching from a higher operating mode to a lower one.

Adaptive mode change component 24 is advantageous compared to previously developed circuits and techniques. Previously developed circuits transitioned from one mode of operating to another solely on the basis of the observed battery voltage. Thus, the transitions occur at fixed points. Because the previously developed circuits do not consider the LED voltage at all, transition from one mode to another could occur at a point when there is excess LED voltage. Such excess LED voltage results in loss of efficiency. Adaptive mode change component 24 generates signals to cause the power stage component 20 to change operating modes not at fixed points of the battery voltage, but rather as a function of battery voltage Vbat, LED forward voltage Vf, and other process and temperature variations which affect LED voltage Vled. Changes in operating mode are determined adaptively to optimize efficiency while providing at least the minimum LED voltage Vled (with transistor 30 still in saturation) required for accuracy of individual LED currents Iled over typically operating ranges, thus maintaining uniform or consistent brightness of the LEDs 12.

Figure 6:
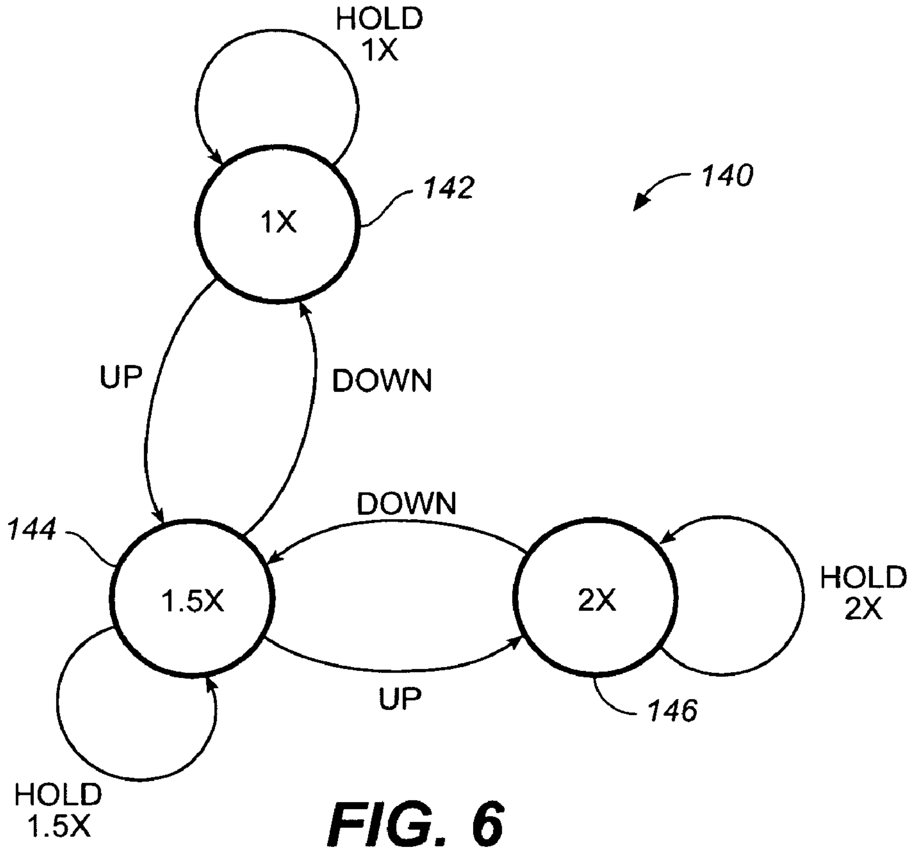
FIG. 6 is a state diagram for a state machine used to implement logic control component, according to an embodiment of the present invention.

FIG. 6 is a state diagram 140 for a state machine used to implement logic control component 110, according to an embodiment of the present invention. As shown, state diagram 140 has three states: 1× state 142, 1.5× state 144, and 2× state 146. In 1× state 142 for the state machine, power stage component 20 is functioning in the 1× operating mode. The state machine may either continue to hold at the 1× operating mode (HOLD 1×), or it may move up to the 1.5× state 144 (UP). In the 1.5× state 144 for the state machine, power stage component 20 is functioning in the 1.5× operating mode. The state machine may either continue to hold at the 1.5× operating mode 144 (HOLD 1.5×), move down to the 1× state 142 (DOWN), or move up to the 2× state 146 (UP). In the 2× state 146 for the state machine, power stage component 20 is functioning in the 2× operating mode. The state machine may either continue to hold at the 2× operating mode 146 (HOLD 2×) or move down to the 1.5× state 144 (DOWN). The UP and DOWN changes between the various states can be executed in response to the ch-mode-up and ch-mode-dn signals (of FIG. 5). As understood to one in the art, the state machine for state diagram 140 can be implemented with any suitable circuitry for performing the logic described.

Figure 7:
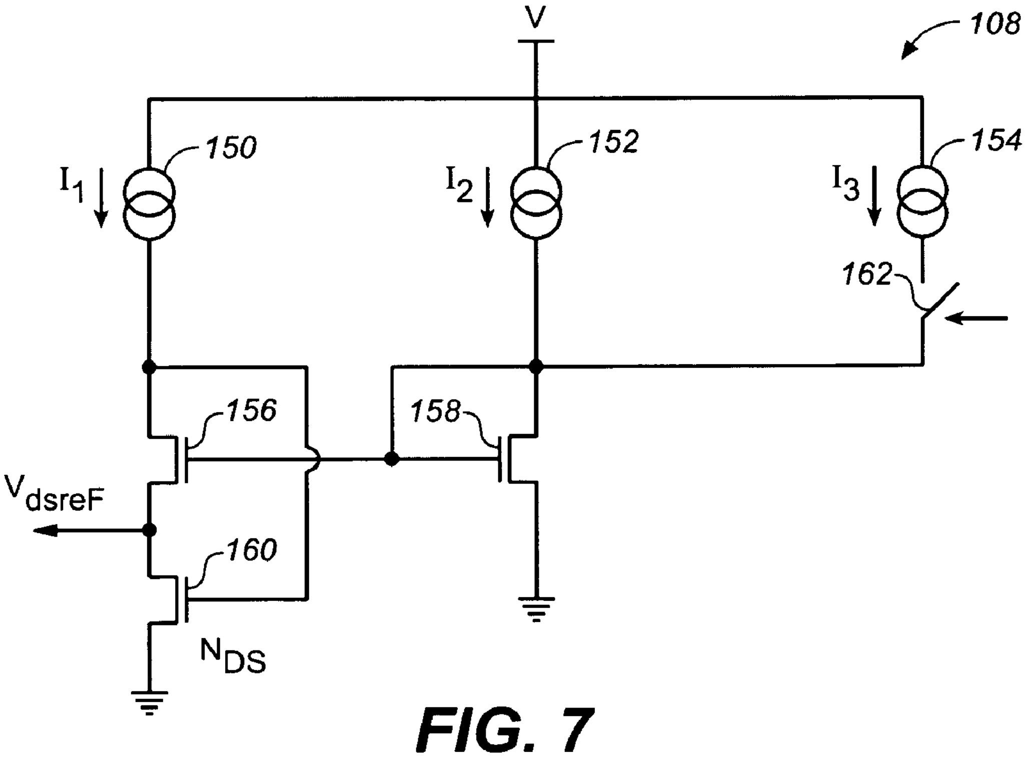
FIG. 7 is a schematic diagram for a Vds reference generator component, according to an embodiment of the present invention.

FIG. 7 is a schematic diagram for a Vds reference generator component 108, according to an embodiment of the present invention. Vds reference generator 108 generally functions to generate a reference voltage Vdsref which is adaptive and may change to have a value slightly higher than the saturation voltage Vdsat of transistor 30 in the LED driver loop 22 at all times, regardless of variations in forward voltage Vf, process, temperature, LED current Iled, and the like.

In one embodiment, as shown, Vds reference generator 108 (FIG. 7) may be implemented using current sources 150, 152, and 154, which output first bias current ($I_1$), second bias current ($I_2$), and programmable third bias current ($I_3$), respectively. A first transistor 156 has a drain, a source, and a gate. The first bias current ($I_1$) flows through the drain of the first transistor 156. A second transistor 160 has a drain, a source, and a gate. The drain of the second transistor 160 is connected to the source of the first transistor 156. The gate of the second transistor 160 is connected to the drain of the first transistor 156. The source of the second transistor 160 is connected to ground. The second bias current ($I_2$) and programmable third bias current ($I_3$) flow through a third transistor 158. The third transistor 158 has a drain, a source, and a gate. The third transistor 158 has its drain connected to its gate. The gate of the third transistor 158 is connected to the gate of the first transistor 156. The drain-to-source voltage of the second transistor 160 provides a Vds reference voltage against which the LED voltage can be compared. The Vds reference voltage is adjustable through the programmable third bias current ($I_3$).

Figures 8, 9:
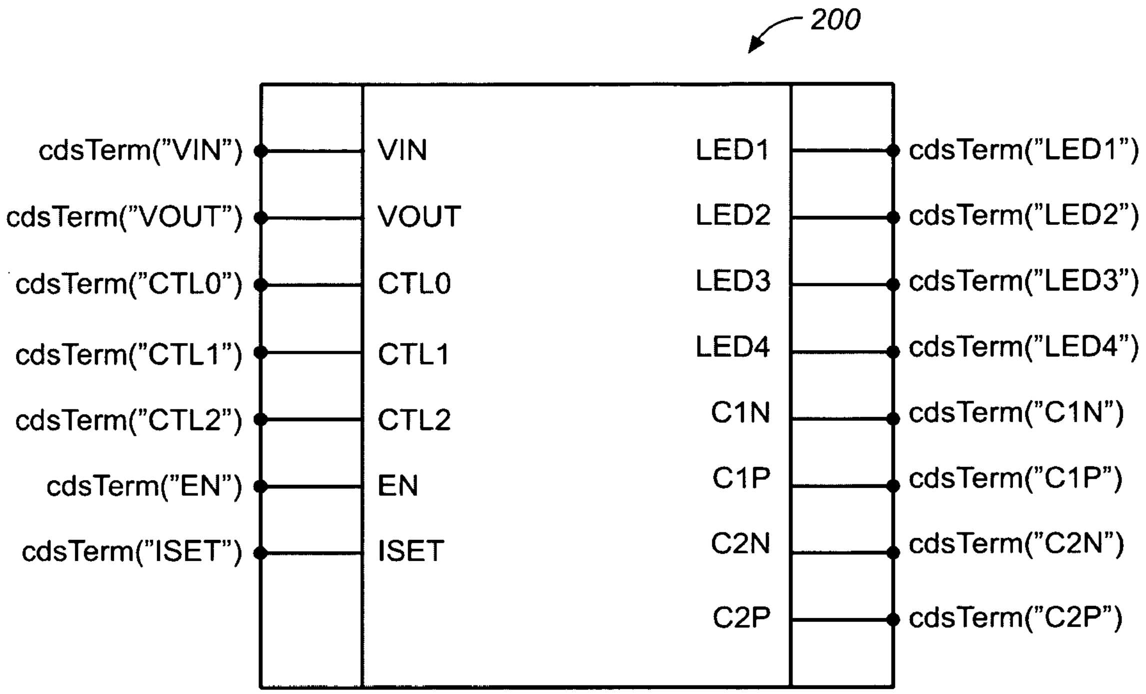
FIG. 8 is a diagram for a pin-out of an integrated circuit device for driving one or more LEDs, according to an embodiment of the present invention.
FIG. 9 is a truth table for LED control signals, according to an embodiment of the present invention.

FIG. 8 is a diagram for a pin-out of an integrated circuit device 200, according to an embodiment of the present invention. In one embodiment, the integrated circuit device 200 can implement the system 10 for driving one or more light emitting diodes (LEDs) 12.

The integrated circuit device 200 can include one or more monolithic semiconductor dies or "chips" which are incorporated into a single package. It should also be understood that the systems, apparatuses, and methods of the present invention are not limited by the type of chip packaging and is applicable for any type of chip or multi-chip semiconductor packaging. As an example, the chip can be packaged as a standard ball grid array (BGA), micro-ball grid array (MBGA), or thin quad flatpack (TQFP) having suitable leads or other connecting points extending therefrom. However, other types of packaging may be used. For example, the chip packaging may have a ceramic base with chips wire bonded or employing thin film substrates, mounted on a silicon substrate, or mounted on a printed circuit board (PCB) or multichip module (MCM) substrate such as a multi-chip package (MCP). The packaging may further utilize various surface mount technologies such as a single in-line package (SIP), dual in-line package (DIP), zig-zag in-line package (ZIP), plastic leaded chip carrier (PLCC), small outline package (SOP), thin SOP (TSOP), flatpack, and quad flatpack (QFP), to name but a few, and utilizing various leads (e.g., J-lead, gull-wing lead) or BGA type connectors.

The integrated circuit device 200 comprises a number of input/output (I/O) terminals which can connect to components external to integrated circuit device 200. As shown, these I/O terminals can include VIN, VOUT, ISET, CTL0, CTL1, CTL2, EN, ISET, LED1, LED2, LED3, LED4, C1N, C1P, C2N, and C2P.

Terminal VIN is used as a connection for a battery, which may provide battery voltage Vbat. Terminal VOUT is used to provide output voltage Vout for powering a number of LEDs 12. The LEDs 12 are also connected to terminals LED1, LED2, LED3, and LED4 for respective LED voltages Vled.

Terminal ISET provides a connection for external resistor Rset, which can be configured or selected to provide a desired amount of current Irset in system 10. Terminals CTL0, CTL1, CTL2, and EN can receive control signals for enabling the device 200 and controlling output and brightness of LEDs 12. A truth table for the CTL0, CTL1, CTL2, and EN signals is provided in FIG. 9. Terminals C1N, C1P C2N, and C2P provide connections for external capacitors C1 and C2, which can be part of a charge pump in power stage component 20.

FIG. 9 is a truth table 300 for LED control signals, according to an embodiment of the present invention. In one embodiment, LEDs 12 can be separately turned on and off or otherwise controlled with the CTL0, CTL1, CTL2, and EN signals. As shown, if the EN signal is low (logic 0), then all LEDs 12 are turned off. Otherwise, when the EN signal is high (logic 1), then the various LEDs 12 (corresponding to terminals LED1, LED2, LED3, and LED4) are either turned on or turned off depending upon the combination of values for control signals CTL0, CTL1, and CTL2.

Figure 10A:
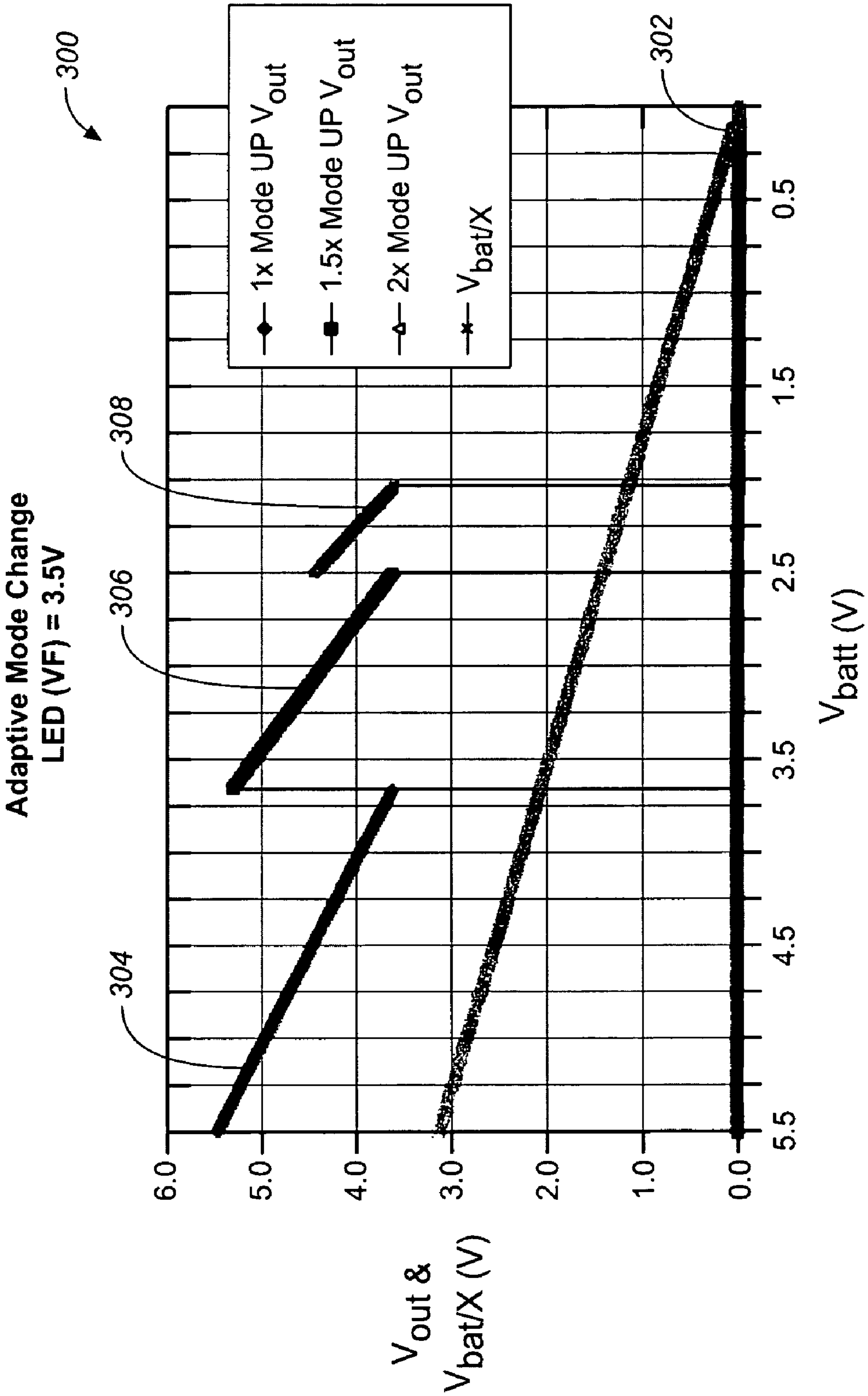
FIGS. 10A through 10C are charts illustrating adaptive mode change, according to an embodiment of the present invention.
Figure 10B:
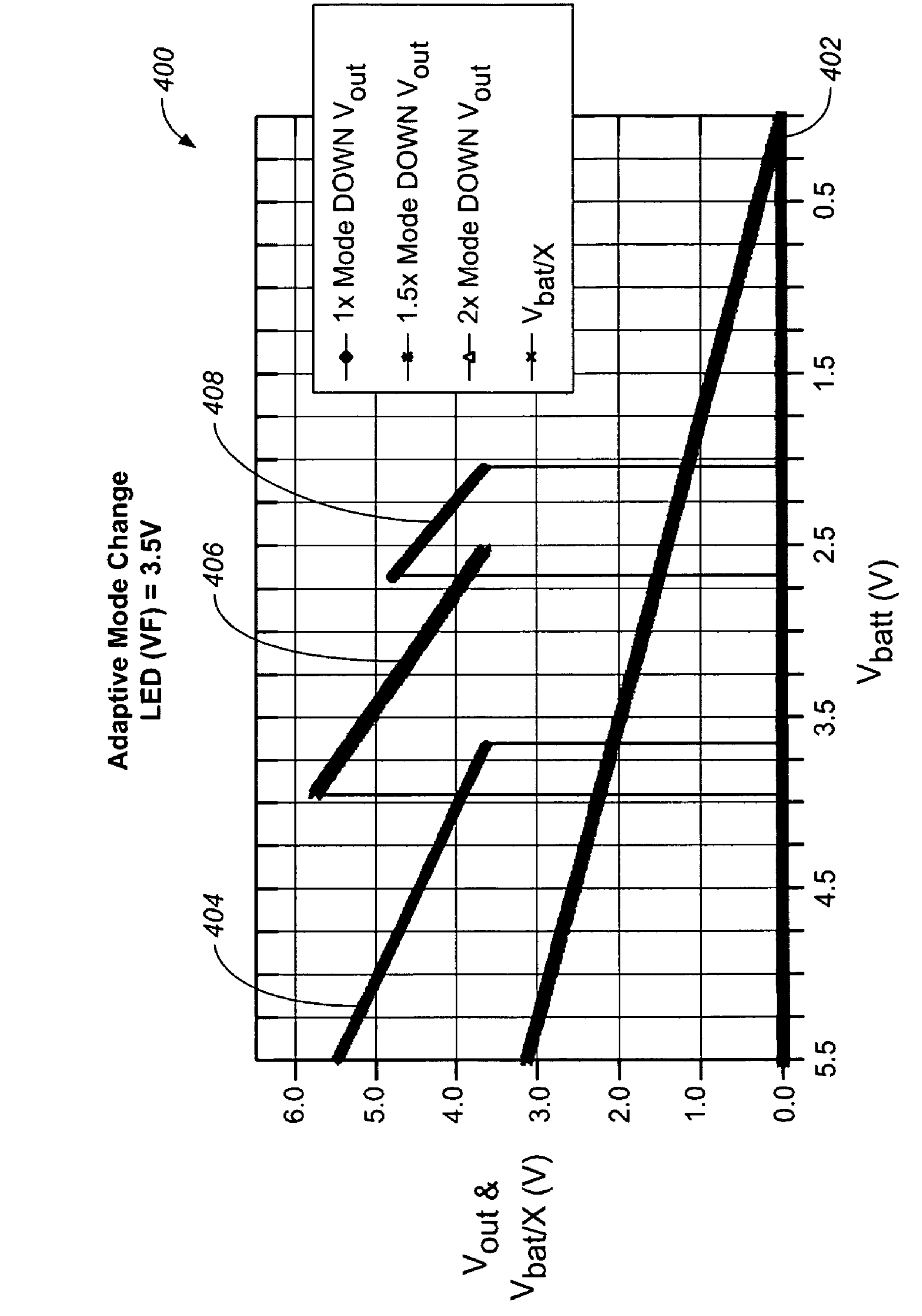
Figure 10C:
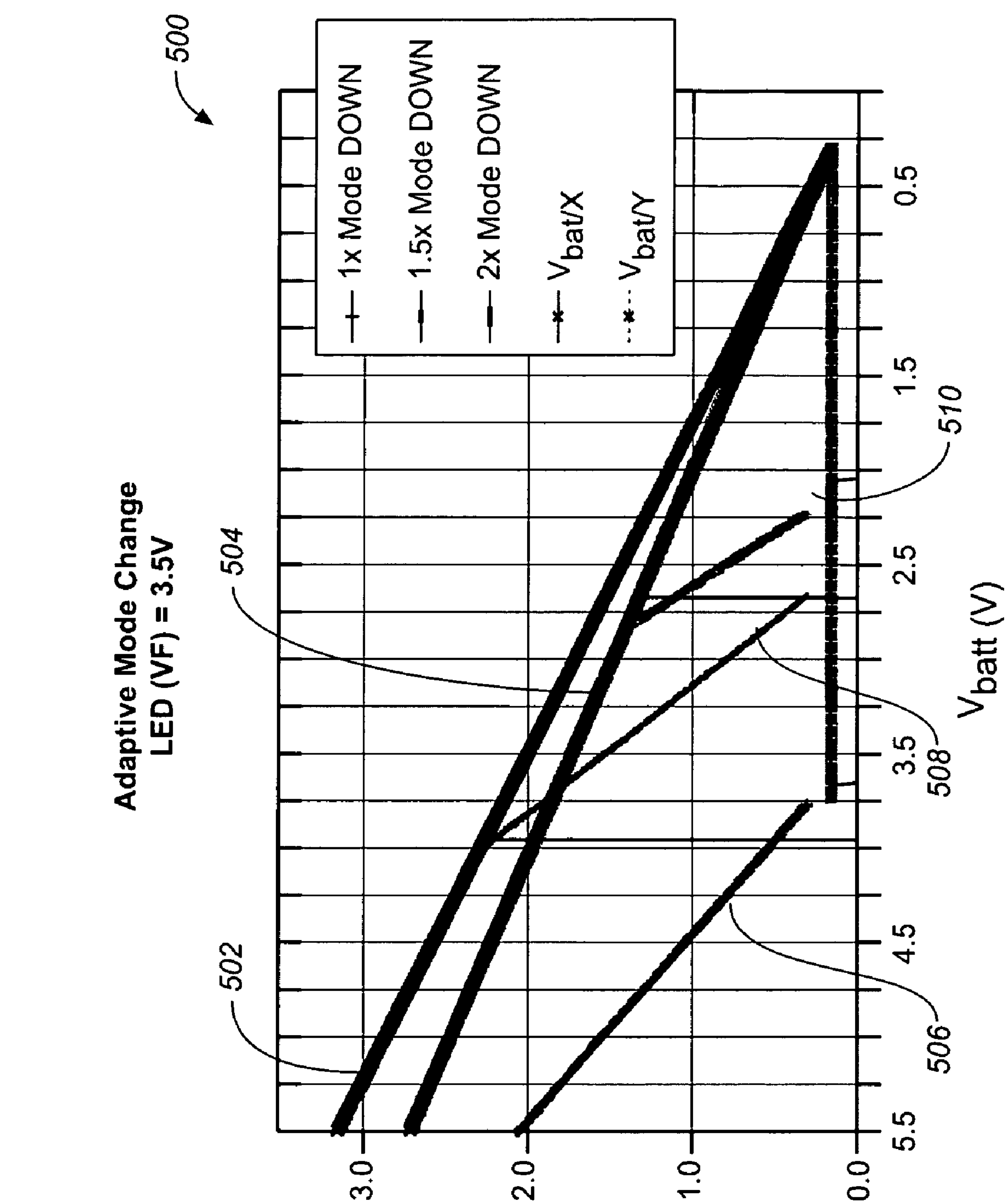

FIGS. 10A through 10C are chart illustrating adaptive mode change, according to an embodiment of the present invention. In general, the technique of adaptive mode change described herein can be used in a variety of applications and systems to increase efficiency. With adaptive mode change, embodiments of the present invention adaptively determine or control the changes in operating mode of, for example, power stage component 20 based on the saturation voltage Vdsat requirements of transistor 30 shown in FIG. 1. In particular, adaptive mode change allows embodiments of the invention to observe or monitor the voltage across a particular element or component (e.g., Vled), correct it for temperature and process variations, and initiate changes in an operating mode (e.g., when the observed or monitored voltage has the same value as Vdsat of transistor 30). This provides maximum overall efficiency.

Referring to FIG. 10A, a chart 300 is depicted for one implementation of adaptive mode change. The left side of chart 300 corresponds to a fully charged battery (e.g., with a battery voltage (VBATT or Vbat) level of 5.5V). The right side of the chart 300 corresponds to a depleted battery (e.g., with a battery voltage level of approximately 0V).

At the left side of the chart 300, the system may be operating in 1× operating mode where the output voltage (VOUT or Vout) has the value of the battery voltage Vbat. The voltage level of the battery is represented by line 302, and the output voltage in 1× operating mode is represented by line 304. Movement from the left side of the chart 300 to the right side corresponds to a decrease in battery level. At some point, when the value of battery voltage Vbat has dropped below a particular threshold (e.g., 3.8V), then the system may be switch into 1.5× operating mode, where the output voltage Vout has a value that is essentially one-and-a-half times greater than the battery voltage Vbat. The output voltage Vout in 1.5× operating mode is represented by line 306. As the battery continues to be depleted of power, at some other point the value of the battery voltage Vbat may drop below another threshold (e.g., 2.8V). The system is switched to operate in 2× operating mode, where the output voltage Vout has a value which is essentially twice that of the battery voltage Vbat. The output voltage Vout in 2× operating mode is represented by line 308. It can be observed that in 1.5× and 2× operating modes the slopes of dVout/dt are approximately equal to 1.5×slope of Vbat and 2×slope of Vbat, respectively.

Movement from the right side of the chart 300 to the left side corresponds to an increase in battery level, which may occur when the battery is being charged. As shown, in this implementation represented by chart 300, during charging of the battery, the system will switch between operating modes at the same points (e.g., 3.8V and 2.8V) as when the battery is being depleted.

Referring to FIG. 10B, a chart 400 is depicted for another implementation of adaptive mode change. Chart 400 is similar to chart 300 in many respects. Line 402 represents the voltage level of the battery (VBATT or Vbat), and lines 404, 406, and 408 represent the output voltage in the 1×, 1.5×, and 2× operating modes, respectively.

With this implementation shown in chart 400, however, hysteresis is introduced into the system. This means that the switching between operating modes as the battery is being charged does not occur at the same points as the switching between operating modes when the battery is being depleted. Thus, as shown in FIG. 10B, switching from 1× operating mode to 1.5× operating mode as the battery is being depleted occurs at approximately 3.6V, while switching from 1.5× operating mode to 1× operating mode as the battery is being charged occurs at approximately 3.9V. Similarly, switching from 1.5× operating mode to 2× operating mode as the battery is being depleted occurs at approximately 2.5V, while switching from 2× operating mode to 1.5× operating mode as the battery is being charged occurs at approximately 2.7V. Hysteresis provides stability for the system by preventing oscillations between operating modes which might otherwise occur due to premature switching from a higher operating mode to a lower one.

Referring to FIG. 10C, a chart 500 is depicted for another implementation of adaptive mode change. Chart 500 represents another system with hysteresis. In this case, scaling factors X and Y are applied to the battery voltage (VBATT or Vbat). The scaling factors X and Y are used to set points where operating mode changes as the battery is being charged. Lines 502 and 504 represent the voltage levels of Vbat/X and Vbat/Y, respectively, and lines 506, 508, and 510 represent the output voltage (Vout) in the 1×, 1.5×, and 2× operating modes, respectively.

In 1× operating mode, the output voltage Vout is approximately equal to the battery voltage Vbat. In 1.5× and 2× operating modes, the output voltage Vout is 1.5× and 2× times the battery voltage Vbat, respectively. With the battery voltage Vbat divided by scaling factors X and Y (i.e., Vbat/X and Vbat/Y, respectively), then the LED pin voltage Vled (which is equal to the output voltage Vout−Vf (of the LED), see FIG. 1), will intercept Vbat/X and Vbat/Y at one unique point for each. By adjusting the values of scaling factors X and Y hysteresis can be introduced, which is desirable for the system to work reliably in the presence of charge pump and system noise. If X=1 and Y=1, there is no hysteresis and the points where change occurs between operating modes 1× and 1.5× and between operating modes 1.5× and 2× are the same for both decreasing battery voltage level and increasing battery voltage level. Because all of the instances of change between operating modes are based on Vled voltage (where Vled=Vout−Vf (of LED)), mode change according to some embodiments of the invention is adaptive to variations in Vf (of LED) voltages, device parameters, process corners, temperature, operating point (i.e. LED currents, etc.), and the like. This yields optimized peak efficiency independent of the variations mentioned above.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. A system for driving at least one light-emitting diode (LED) using power from a power source, the system comprising:

means for tracking at least one variation which affects brightness of the at least one LED;

means for detecting a level of a source voltage output by the power source;

means for providing a plurality of operational modes, wherein each operational mode corresponds to driving the LED with an output voltage that is a respective different multiple of the source voltage output by the power source and, in at least one of the operational modes, the output voltage is higher than the source voltage;

means for maintaining an LED current flowing through the LED at a desired value in the plurality of operational modes, the means for maintaining the LED current including an LED driver loop to sink the LED current; and means for generating one or more control signals, in response to the tracking means and the detecting means, for adaptively changing among the plurality of operational modes for driving the at least one LED in order to maintain consistent brightness for the at least one LED.

2. The system of claim 1 wherein the means for tracking is operable to provide a reference voltage which tracks a drain-to-source saturation voltage of a transistor in series with the LED.

3. The system of claim 1 wherein the means for tracking is operable to compare the LED cathode voltage against a reference voltage which tracks a drain-to-source saturation voltage of a transistor in series with the LED.

4. The system of claim 1 comprising a reference generator operable to generate a reference voltage against which a voltage of the LED can be compared.

5. The system of claim 4 wherein the reference generator comprises:

a first transistor having a drain, a source, and a gate; and the first transistor through its drain a first bias current flows; and a second transistor having a drain, a source, and a gate; the drain of the second transistor is connected to the source of the first transistor; the gate of the second transistor is connected to the drain of the first transistor; the source of the second transistor is tied to ground; and a third transistor having a drain, a source, and a gate, wherein the third transistor has its drain connected to its gate, and the gate of the third transistor is connected to the gate of first transistor; and a second bias current and a programmable third bias current flow through the drain of the third transistor; and the drain-to-source voltage of the second transistor provides a reference voltage against which the LED voltage can be compared; and the reference voltage is adjustable through the programmable third bias current.

6. The system of claim 1 wherein the means for detecting comprises at least one resistor connected to the power source to indicate the source voltage of the power source.

7. The system of claim 1 wherein the means for tracking comprises a comparator operable to compare the LED cathode voltage against a reference voltage.

8. The system of claim 1 wherein the at least one variation is a variation in one of temperature, manufacturing process, or operating point.

9. The system of claim 1 wherein the at least one variation is a variation in forward voltage drop across the LED.

10. A system for adaptively changing an operating mode of a power stage component for an electrical device, the system comprising:

means for tracking at least one variation which affects an operating characteristic of the electrical device;

means for detecting a level of a source voltage output by a power source connected to and supplying power to the power stage component;

means for providing a plurality of operating modes of the power stage component, wherein each operating mode corresponds to driving the electrical device with an output voltage that is a respective different multiple of the source voltage output by the power source and, in at least one of the operational modes, the output voltage is higher than the source voltage;

means for maintaining an operating current flowing through the electrical device at a desired value in the plurality of operational modes of the power stage component, the means for maintaining the operating current including a driver loop to sink the operating current; and means for generating at least one control signal, in response to the tracking means and the detecting means, for changing among the plurality of operating modes of the power stage component for driving the electrical device in order to maintain the operating characteristic for the electrical device at a consistent level.

11. The system of claim 10 wherein the at least one variation is a variation in one of temperature, manufacturing process, or operating point.

12. The system of claim 10 wherein the electrical device is one of a light emitting diode (LED), or any type of P-N diode.

13. The system of claim 10 wherein the means for tracking is operable to provide a reference voltage which tracks a drain-to-source saturation voltage of a transistor in series with the electrical device.

14. The system of claim 10 wherein the means for tracking is operable to compare the voltage across the electrical device against a reference voltage which tracks a drain-to-source saturation voltage of a transistor in series with the electrical device.

15. The system of claim 10 wherein the power stage component comprises:

a transistor operable to pass the power output by the power source to the electrical device in a first operating mode;

a charge pump operable to generate the output voltage that is higher than the source voltage output by the power source and to provide the generated output voltage to the electrical device in a second operating mode.

16. The system of claim 10 wherein the operating mode of the power stage component depends on the level of the source voltage output by the power source and the drain-to-source voltage of a transistor in series with the electrical device.

17. The system of claim 10 wherein the operating modes of the power stage component comprise a 1× operating mode, a 1.5× operating mode, and a 2× operating mode.

18. A system for driving an electrical device using power from a power source, the system comprising:

a power stage component coupled to the power source and operable to provide an output voltage to the electrical device, wherein the power stage component is capable of operating in a plurality of operational modes depending on one or more control signals, wherein each operational mode corresponds to driving the electrical device by the power stage component with an output voltage level that is a respective different multiple of a source voltage output by the power source and, in at least one of the operational modes, the output voltage is higher than the source voltage;

a driver loop for sinking an operating current flowing through the electrical device, the driver loop configured to maintain the operating current at a desired value in the plurality of operational modes of the power stage component; and an adaptive mode change component coupled to the power source and to the power stage component and operable (i) to detect a level of the source voltage, (ii) to track at least one variation which affects an operating characteristic of the electrical device and (iii) to generate the one or more control signals for changing among the plurality of operating modes of the power stage component according to the detection and the tracking in order to maintain the operating characteristic for the electrical device at a consistent level.

19. The system of claim 18 wherein the power source comprises a battery.

20. The system of claim 18 wherein the operating characteristic is brightness.

21. The system of claim 18 wherein the electrical device is one of a light emitting diode (LED), or any type of P-N diode.

22. The system of claim 18 wherein the power stage component comprises a charge pump operable to generate the output voltage that is higher than the source voltage of the power source.

23. The system of claim 1 wherein the means for providing a plurality of operational modes comprises a charge pump operable to generate the output voltage that is higher than the source voltage of the power source.

24. The system of claim 1 wherein the power source comprises a battery.

25. The system of claim 10 wherein the power source comprises a battery.

26. The system of claim 10 wherein the operating characteristic is brightness.

27. A method for driving at least one light-emitting diode (LED) using power from a power source, the method comprising:

tracking at least one variation which affects brightness of the at least one LED;

detecting a level of a source voltage output by the power source;

providing a plurality of operational modes, wherein each operational mode corresponds to driving the LED with an output voltage that is a respective different multiple of the source voltage output by the power source and, in at least one of the operational modes, the output voltage is higher than the source voltage;

maintaining an LED current flowing through the LED at a desired value in the plurality of operational modes, the means for maintaining the LED current including an LED driver loop to sink the LED current; and generating one or more control signals according to the tracking and the detecting for adaptively changing among the plurality of operational modes for driving the at least one LED in order to maintain consistent brightness for the at least one LED.

28. The method of claim 27 wherein providing a plurality of operational modes comprises using a charge pump to generate the output voltage that is higher than the source voltage of the power source.

29. The method of claim 27 wherein the power source comprises a battery.

30. The method of claim 27 wherein the at least one variation is a variation in one of temperature, manufacturing process, or operating point.

31. The method of claim 27 wherein the at least one variation is a variation in forward voltage drop across the LED.

32. A system for driving at least one light-emitting diode (LED) using power from a power source, the system comprising:

a tracking circuitry for tracking at least one variation which affects brightness of the at least one LED;

a power stage component coupled to the power source and operable to provide an output voltage to drive the at least one LED, wherein the power stage component is capable of providing a plurality of operational modes, wherein each operational mode corresponds to driving the LED by the power stage component with an output voltage level that is a respective different multiple of a source voltage output by the power source and, in at least one of the operational modes, the output voltage is higher than the source voltage;

a driver loop for sinking an LED current flowing through the LED, the driver loop configured to maintain the LED current at a desired value in the plurality of operational modes of the power stage component; and a control circuitry for generating one or more control signals in response to the tracking circuitry and according to the source voltage of the power source, the control signals controlling the power stage component for adaptively changing among the plurality of operational modes in order to maintain consistent brightness for the at least one LED.

33. The system of claim 32 wherein the power source comprises a battery.

34. The system of claim 32 wherein the power stage comprises a charge pump operable to generate the output voltage that is higher than the source voltage of the power source.

* * * * *